United States Patent
Shackle et al.

(10) Patent No.: US 8,736,189 B2
(45) Date of Patent: May 27, 2014

(54) ELECTRONIC BALLASTS WITH HIGH-FREQUENCY-CURRENT BLOCKING COMPONENT OR POSITIVE CURRENT FEEDBACK

(75) Inventors: Peter W. Shackle, Rolling Hills, CA (US); Zhanqi Du, Baldwin Park, CA (US)

(73) Assignee: Fulham Company Limited, Hong Kong (HK)

( * ) Notice: Subject to any disclaimer, the term of this patent is extended or adjusted under 35 U.S.C. 154(b) by 2101 days.

(21) Appl. No.: 11/615,950

(22) Filed: Dec. 23, 2006

(65) Prior Publication Data

US 2008/0150447 A1 Jun. 26, 2008

(51) Int. Cl.
*H05B 41/16* (2006.01)

(52) U.S. Cl.
USPC ........... 315/247; 315/278; 315/291; 315/312; 315/185 S

(58) Field of Classification Search
USPC ................. 315/247, 224, 225, 274–279, 291, 315/307–311
See application file for complete search history.

(56) References Cited

U.S. PATENT DOCUMENTS

| | | |
|---|---|---|
| 4,017,785 A | 4/1977 | Perper |
| 4,045,711 A | 8/1977 | Pitel |
| 4,511,823 A | 4/1985 | Eaton et al. |
| 4,782,268 A | 11/1988 | Fänrich et al. |
| 5,008,597 A | 4/1991 | Zuchtriegel |
| 5,032,767 A | 7/1991 | Erbardt et al. |
| 5,374,875 A | 12/1994 | Shackle et al. |
| 5,399,944 A | 3/1995 | Konopka et al. |
| 5,404,082 A | 4/1995 | Hernandez et al. |
| 5,412,287 A | 5/1995 | Shackle |
| 5,488,269 A | 1/1996 | El-Hamamsy et al. |
| 5,521,467 A | 5/1996 | Statnic et al. |
| 5,757,143 A | 5/1998 | Hernandez Martucci et al. |
| 5,874,809 A | 2/1999 | Hagen |
| 5,994,847 A | 11/1999 | Konopka |
| 5,994,848 A | 11/1999 | Janczak |
| 6,034,489 A | 3/2000 | Weng |
| 6,051,940 A | 4/2000 | Arun |
| 6,100,646 A | 8/2000 | Janczak et al. |
| 6,144,169 A | 11/2000 | Janczak |
| 6,185,117 B1 | 2/2001 | Courier De Mere |
| 6,316,883 B1 | 11/2001 | Cho et al. |
| 6,337,800 B1 | 1/2002 | Chang |
| 6,366,027 B1 | 4/2002 | Aendekerk et al. |

(Continued)

OTHER PUBLICATIONS

STMICROELECTRONICS, AN993 Application Note, Electronic Ballast with PFC Using L6574 and L6561, 2004, pp. 1-20.

(Continued)

*Primary Examiner* — Tuyet Thi Vo
(74) *Attorney, Agent, or Firm* — Henricks, Slavin & Holmes LLP

(57) ABSTRACT

Methods and apparatus are described that can provide improved power factor correction and total harmonic distortion, efficiency and/or direct feedback of load current variations to a power source inverter. In one example, a power supply, for example, a ballast, can have an input circuit, an output circuit and an inverter circuit coupled between the input circuit and the output circuit. A current feedback circuit is coupled between the output circuit and the inverter circuit and configured to feed current back to the inverter circuit through a transformer stage separate from the inverter as a function of a current level in the output circuit.

8 Claims, 4 Drawing Sheets

(56) References Cited

U.S. PATENT DOCUMENTS

| | | |
|---|---|---|
| 6,376,997 B1 | 4/2002 | Aendekerk |
| 6,388,395 B1 | 5/2002 | Aendekerk |
| 6,429,604 B1 | 8/2002 | Chang |
| 6,577,077 B2 | 6/2003 | Hu et al. |
| 6,674,246 B2 | 1/2004 | Moisin |
| 6,680,587 B1 | 1/2004 | Trestman et al. |
| 6,906,473 B2 * | 6/2005 | Alexandrov .................. 315/224 |
| 6,933,681 B2 | 8/2005 | Rudolph |
| 7,061,781 B2 * | 6/2006 | Heckmann et al. ............. 363/81 |
| 2005/0248295 A1 | 11/2005 | Chiou |
| 2006/0061297 A1 | 3/2006 | Heckmann |

OTHER PUBLICATIONS

Yang, Bo; Topology investigation of front end DC/DC converter for distributed power system; Dissertation; 2003, Chapter 4, pp. 94-141.

Qian, Jinrong; New Charge Pump Power-Factor-Correction Electronic Ballast with a Wide Range of Line Input Voltage; IEEE Transactions on Power Electronics, Jan. 1999, pp. 193-201, vol. 14, No. 1, IEEE.

* cited by examiner

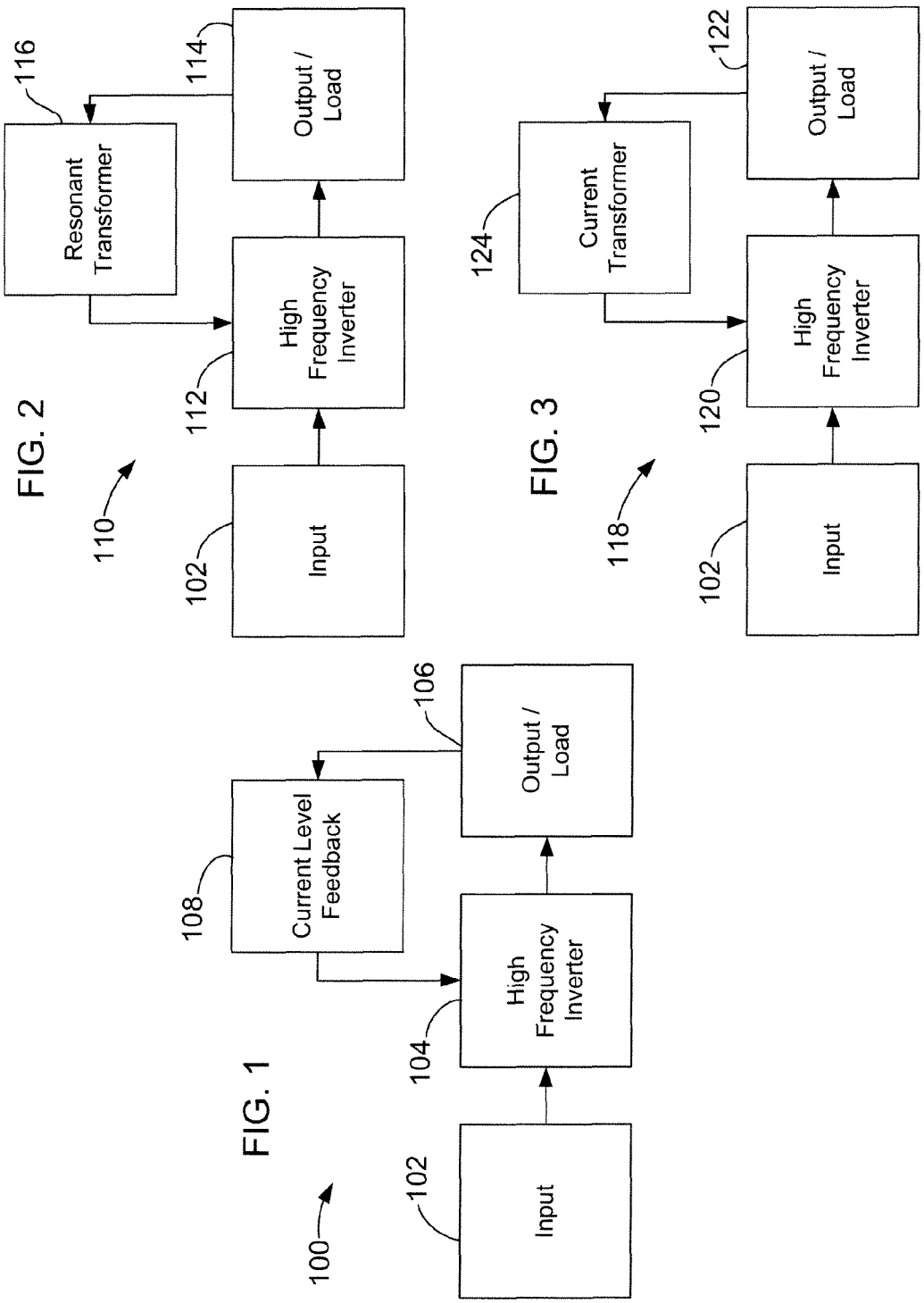

ELECTRONIC BALLASTS WITH HIGH-FREQUENCY-CURRENT BLOCKING COMPONENT OR POSITIVE CURRENT FEEDBACK

BACKGROUND

1. Field

This relates to power sources, including for example constant current sources such as electronic ballasts that may be used with gas discharge lamps such as fluorescent lamps, and similar power sources, including for example ones in which power from the output is fed back to the input in order to achieve power factor correction of the input current.

2. Related Art

In electronic ballast-types of power sources, AC power is supplied to a load such as a fluorescent lamp in a constant-current mode to insure reliable and adequate production of light in the lamp. Incoming current is taken from a line supply, rectified and applied to an inverter to generate a high frequency alternating current signal. The high frequency alternating current signal is applied at an output to a transformer that induces a constant current signal in a lamp circuit for driving the lamp or lamps. If the AC current on the incoming line is not in phase with the voltage, then current is drawn from the utility lines at times when there is not proportionate voltage, typically resulting in wasted power. In such situations, the power factor of the circuit is less than optimum (1 or unity), for example significantly less than 95 percent. Additionally, total harmonic distortion (THD) is high which can result in overheating of power line neutral conductors in big buildings.

Some conventional electronic ballasts apply power factor correction to improve efficiency and reduce total harmonic distortion. Power factor correction can be accomplished using a boost circuit, though other circuits can also be used for power factor correction. With a boost circuit, however, expensive transistors, inductors and control chips are used, resulting in higher costs. In a charge pump boost circuit, power factor correction may be provided at a relatively low added cost, but the resulting circuit may be inefficient for example because of a large circulating current. Additionally, some ballasts incorporating charge pump boost circuits may be damaged if lamps are removed while the ballast is operating. Protection circuits added to the ballast circuit may make the ballast more complex or inefficient, which mitigates the cost advantages of the resulting product.

SUMMARY

Methods and apparatus are described herein that can provide improved power factor correction or total harmonic distortion with few additional components. Expensive control circuits can be omitted. Additionally, in one or more aspects of the methods and apparatus described, an input current when driving a load such as a fluorescent lamp can be produced which approximates very closely to a sine wave. (Where the singular term "lamp" is used herein, it is understood that plural lamps or more than one lamp could be included.) One or more of these benefits can be achieved using one or more aspects of the methods and apparatus described herein.

In one example, a power supply, for example a ballast circuit, includes an input and an output and an inverter circuit coupled between the input and the output. The inverter circuit may be a parallel resonant circuit, for example. A feedback circuit, for example a power feedback circuit, is coupled between the input and the inverter circuit. The feedback circuit is configured to adjust the power factor of the power supply. In one example, the power supply can include a high-frequency-current blocking component in the feedback circuit, for example to limit through lamp leakage or other current leakage to the load. In the example of a parallel resonant inverter circuit, with a high-frequency-current blocking component, the component may be an inductor, for example coupled in series with the feedback circuit. In another example, the feedback circuit may be configured to have a transformer function, such as through a current transformer or a resonant inductor, and the feedback circuit may be used to feedback to the inverter circuit a signal that is a function of the load current passing through the load. In this configuration, the current fed back can be made to be larger or smaller amplitude than the output applied to drive the load, in order to improve the power factor of the circuit. The feedback can be increased or decreased. Use of a current transformer in the feedback circuit can reduce or eliminate the possibility of through lamp leakage.

In the power supply of the foregoing example, a control circuit may be included for the input circuit, and the control circuit may include a diode bridge. The diode bridge may be a high frequency rectifying bridge. In another example of the power supply, an output transformer may be used in the output circuit with a secondary, and an inductor may be placed in series with the secondary. Current passing through the load, such as a lamp, is also passed through the inductor. The inductor may be configured to be a resonant inductor, such as by placing a capacitor in parallel with the inductor. The inductor may also take the form of a current transformer in series with the lamp load. The transformer may have a secondary with a capacitor forming part of the feedback to a high frequency rectifier.

In another example, a power circuit such as a ballast circuit includes an input and an output, and an inverter circuit between the input and the output. A control circuit between the input and the inverter circuit receives feedback through a current-level feedback loop. The current level feedback loop may be configured to operate at a substantially constant current. The current level can be adjusted with a transformer, which transformer is preferably different from the output circuit. The transformer may be a resonant transformer, a current transformer or other circuit configuration providing a transformer function. In the case of a resonant inductor, a capacitor may be used in parallel with the transformer, and also in the case of a current transformer. When a current transformer is used, the current transformer can be configured to have a windings ratio chosen to achieve optimal power factor correction for a given lamp current and input line voltage.

In a further example, a power circuit, for example a ballast circuit for a fluorescent lamp, includes an input, an output and a parallel resonant inverter circuit between the input and output. A current feedback circuit feeds current back to the inverter circuit through a transformer stage separate from the inverter circuit as a function of a current level in the output. The feedback can be increased or decreased. The current feedback circuit may include a capacitor across the feedback circuit. The capacitor may be used to adjust the line current waveform to match the line voltage waveform. The transformer stage may include a resonant transformer circuit, a current transformer, or another circuit. For example, the transformer stage may be a circuit that has a low output impedance or one that can apply a signal such as to an input circuit proportional to a current level passing through the lamp.

In an additional example, a power driving circuit, for example a ballast circuit, includes an input and an output. The output may be coupled to a load so the power driving circuit can drive the load. An inverter circuit is between the input and output. A transformer element is coupled to the inverter circuit and is configured to apply to the inverter circuit a signal proportional to a current in a load circuit. In one configuration, the proportional signal is proportional only to a current passing through the load. In another configuration, the output circuit includes a secondary of a transformer and the transformer element is coupled in series with the secondary of the transformer. In another configuration, the transformer element includes a resonant inductor, a current transformer or similar circuit. A capacitor can be coupled in parallel with the resonant inductor or the current transformer.

In another example, a load driving circuit, for example a ballast circuit, can include an input, and output having an output transformer winding for inducing a load current through the load and a parallel resonant inverter circuit between the input and output. The feedback inductance separate from the transformer is coupled to the load so that load current passes through the inductance. In one configuration, the feedback inductance is also coupled to the parallel resonant inverter circuit. The parallel resonant inverter circuit may include a high frequency rectifier, for example a high frequency rectifier bridge, and the high frequency inverter circuit may also have its output coupled to a capacitor. A capacitor can also be coupled in parallel with the feedback inductance. In one example, the feedback inductance can be a resonant inductor, and in another example the feedback inductance may be a current transformer.

In another example, a method is provided for adjusting current in a load circuit. A high frequency alternating current is produced in a driving circuit and the load is driven with a load current proportional to the high frequency alternating current. Part of the load current is transformed and applied to the driving circuit as a function of a magnitude of only the load current. The part of the transformed load current is applied as a feedback to the driving circuit. The feedback can be increased or decreased. The feedback can serve to give a desirable power factor correction with low total harmonic distortion. With the feedback, ballast operation can be self-limiting, when one or all load elements are removed from the circuit.

In another example of a method as described in the preceding paragraph, transforming part of the load current includes passing part of the load current through a parallel circuit of inductor and a capacitor. In another example, the load current can be passed through the windings of a current transformer. The transformed load current can be applied to a rectifier circuit, for example a high frequency rectifier bridge. The transformer ratio may be such that the current applied to the input circuit is either higher or lower than the lamp current.

In a further example of a method, a load can be driven with a load current developed in an output by a high frequency alternating current. The load current can be transformed and the transformed load current can be applied as a feedback current to an inverter. In one configuration, a transformer in the load circuit produces a feedback higher in magnitude than the current through the load. However, the feedback current can be higher in magnitude or lower in magnitude than the current through the load. The transformer can be a current transformer or a resonant transformer.

In an additional example of a method, a driver circuit for driving a load can be produced by identifying the desired input power as a function of an anticipated load. A parallel resonant inverter circuit can be included in the driver circuit for producing an output for generating a load current for the anticipated load, for example fluorescent lamps of a given number, size and wattage. A current feedback circuit is configured to be in series with the anticipated load and includes a transforming element. The transforming element can be a resonant inductor and capacitor, a current transformer or other transforming element. The transformer can be selected to have a number of turns, and a primary and a secondary of the transformer define a turns ratio. The turns ratio may be selected to be proportional to an expected input power, to the inverse of the load current, and to the inverse of a peak voltage for the circuit. For example, the turns ratio may be defined as:

$$N_1/N_2 = P/(V_{in} * I_f),$$ (Turns Ratio)

where $N_1$ equals the number of turns in the primary, $N_2$ equals the number of turns in the secondary, P equals the input power, $V_{in}$ equals the rms input voltage and $I_f$ equals the rms current through the load. This relationship can be used to configure any of the transformer or transformation elements described herein.

In another example, a method is provided for driving a load with a load current, for example in the form of a high frequency alternating current. A current feedback is applied to a driver of the load circuit, for example to change the magnitude of the current produced by the driver for driving the load circuit. In one form of the method, the current feedback is a positive current feedback applied to the driver, such as to increase the magnitude of the current produced by the driver. In another form of the method, the current feedback is applied through a transformer circuit, and in a further form of the method, the current feedback is applied through a resonant inductor circuit. In further forms of the method, the current feedback can be applied through circuits selected according to one or more equations for determining capacitance and/or for determining the turns ratio in a transformer. The current feedback can be increased or decreased.

These and other examples are set forth more fully below in conjunction with drawings, a brief description of which follows.

BRIEF DESCRIPTION OF THE DRAWINGS

FIG. 1 is a schematic and block diagram of a power driving circuit described herein.

FIG. 2 is a schematic and block diagram of an example of a power driving circuit such as that described with respect to FIG. 1.

FIG. 3 is a schematic and block diagram of another example of a power driving circuit such as that described with respect to FIG. 1.

DETAILED DESCRIPTION

Figure 4:
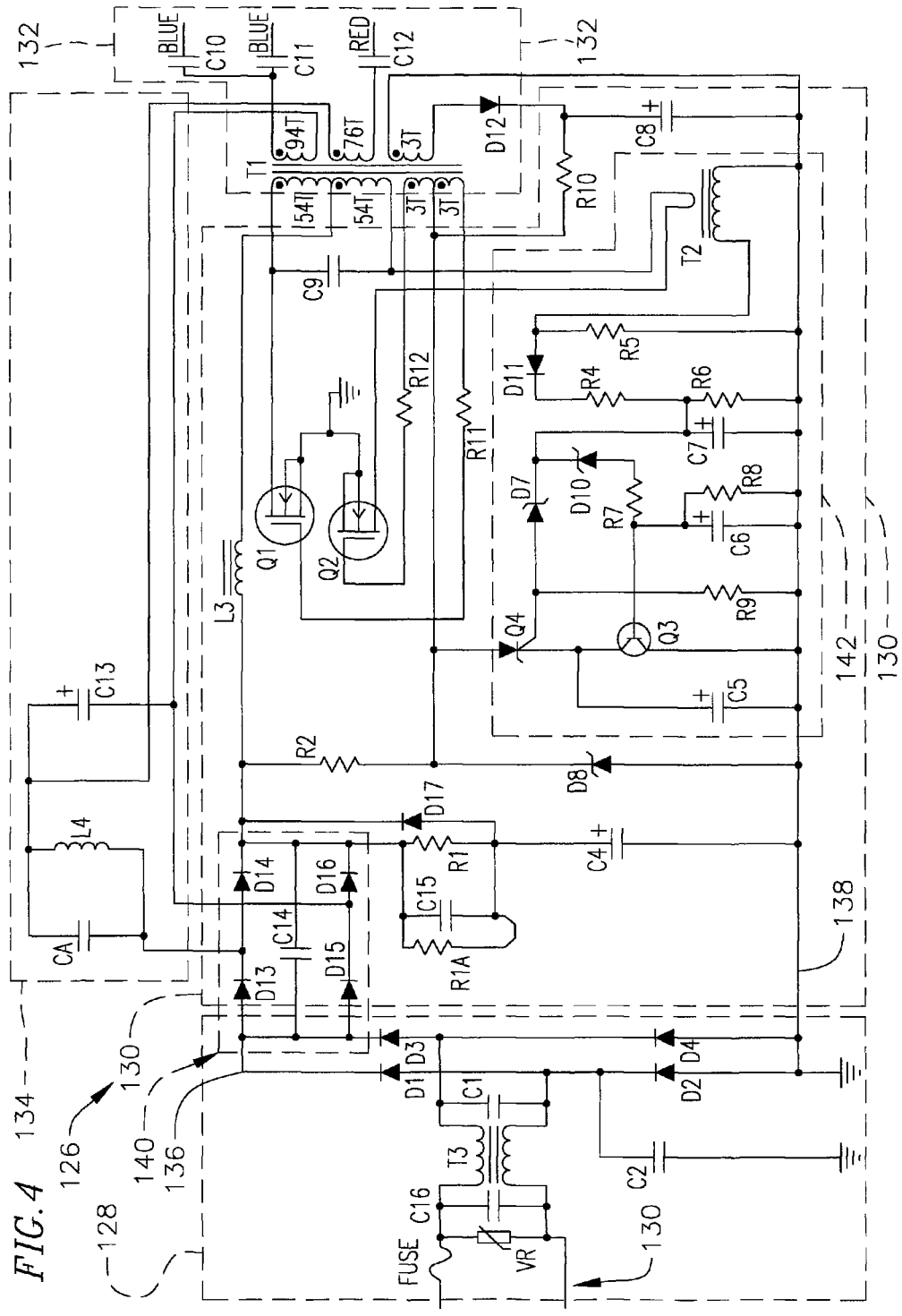
FIG. 4 is a detailed circuit diagram of a power driving circuit of the type represented in FIGS. 1 and 2.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of power circuits and of methods of making and using the power circuits are described. Depending on what feature or features are incorporated in a given structure or a given method, benefits can be achieved in the structure or the method. For example, circuits using a current transformer feedback may achieve high quality power factor correction with THD as low as 2% and self limiting characteristics. This exceptional performance may be achieved with fewer components and lower cost than a traditional boost circuit.

In some configurations of power circuits, improvements can be achieved also in developing and manufacturing a wide variety of circuits having a given underlying design concept, and in some configurations, more reliable circuits can be achieved more consistently. For example, for a given circuit design, an equation or other predictor can be used to configure the circuit design for wide variations in parameters, such as input voltage or load requirements. Therefore, with a given design, a wide variety of power circuits can be made using methods for designing particular power circuits for particular inputs and particular load configurations, such as for different lamps and the like.

Improvements are also provided to users who use the ballasts designed in accordance with the described configurations. For example, the ballasts are simplified and may be more reliable in operation, such as when lamps are removed or fail. With the presently described configurations, for example, the ballasts may be self-limiting.

These and other benefits will become more apparent with consideration of the description of the examples herein. However, it should be understood that not all of the benefits or features discussed with respect to a particular example must be incorporated into a power circuit, component or method in order to achieve one or more benefits contemplated by these examples. Additionally, it should be understood that features of the examples can be incorporated into a power circuit, component or method to achieve some measure of a given benefit even though the benefit may not be optimal compared to other possible configurations. For example, one or more benefits may not be optimized for a given configuration in order to achieve cost reductions, efficiencies, capability to drive multiple lamp types or for other reasons known to the person settling on a particular product configuration or method.

Examples of a number of power circuit configurations and of methods of making and using the power circuits are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Ballast circuits are used as examples of a power circuit that can incorporate one or more of the features and derive some of the benefits described herein, and in particular electronic ballasts for fluorescent lamps. However, power supplies having characteristics similar to those described herein may be used for a number of applications other than for driving fluorescent lamps. In any case, only lamp applications will be described herein. Power circuits other than ballasts and equipment other than ballast and fluorescent lamp combinations can benefit from one or more of the present inventions.

Figure 6:
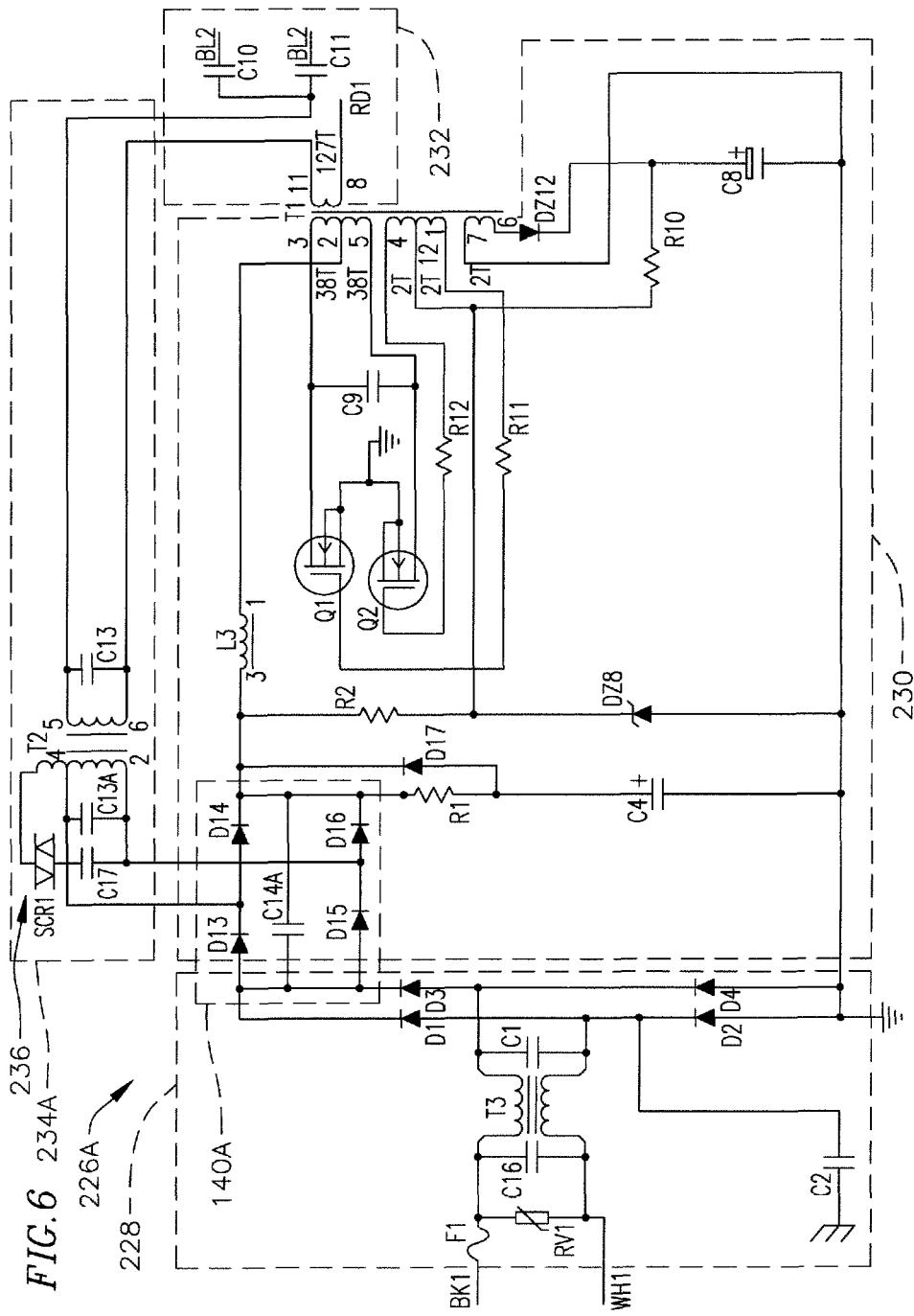
FIG. 6 is a detailed circuit diagram of another example of a power driving circuit of the type represented in FIGS. 1 and 3.

In one example of a ballast circuit, the ballast circuit 100 (FIG. 1) includes an input 102 coupled to a high frequency inverter circuit 104. As will be seen in the discussion of more detailed circuit configurations in conjunction with FIGS. 4 and 6, the input 102 is a conventional line, utility or generator AC input converted to a rectified alternating current signal. The high frequency inverter 104 is coupled to an output or load circuit 106, which is coupled to or includes connections for one or more fluorescent lamps to be driven by the ballast. The high frequency inverter 104 produces a high frequency AC current for driving the lamps. In the examples discussed herein, the high frequency inverter 104 includes a parallel resonant inverter circuit for efficiently producing the desired alternating current signal for the output, and the alternating current signal is typically isolated from the load circuit by a transformer.

The load circuit 106 is coupled through a feedback circuit 108 to the high frequency inverter circuit 104. In the example shown in FIG. 1, the feedback circuit 108 is a transformer or a current level feedback circuit that can make the high frequency current from the high frequency inverter 104 either greater or smaller when it is presented back to the inverter. For example, the feedback circuit 108 may be coupled in series with the lamps and fed back to the high frequency inverter circuit 104 as a manifestation of the current passing through the lamps in order to shape the incoming line current to be proportional to the applied line voltage. The feedback can be used to produce a desirable power factor correction with low total harmonic distortion.

The amplitude of the current being fed back can be adjusted in various ways. In FIG. 2 a resonant transformer is used to adjust the amplitude. The ballast circuit 110 includes the input 102 such as that described previously, and a high frequency inverter 112 for producing a high frequency AC current. The signal developed in the inverter is applied to an output or load circuit 114 for driving a lamp. The output or load circuit 114 is coupled back to the high frequency inverter 112 through a feedback circuit in the form of a resonant inductor circuit 116. The resonant inductor circuit includes a resonating inductor and a capacitor configured to resonate at the same frequency as the current through the output or load circuit 114. As a result, the current in the resonating circuit can be relatively large, and current through the resonating inductor (and therefore through a high frequency rectifier bridge in the high frequency inverter) can be greater than the lamp current which is being fed back to the high frequency inverter circuit 112. Adjusting the current level feedback, for example in this way, can lead to better power factor correction in the ballast circuit. Additionally, the current waveform at the input can more closely resemble the voltage waveform at the input.

In a further example of a ballast circuit (FIG. 3) a current transformer is used to adjust the current being fed back to be the right amplitude. The ballast circuit 118 includes the input 102 and a high frequency inverter 120 for producing a high frequency AC current. The signal developed in the inverter is applied to an output or load circuit 122 for driving a lamp. The output circuit 122 is coupled back to the high frequency inverter 120 through a feedback and isolation circuit. In the example shown in FIG. 3, the feedback and isolation circuit is in the form of a current transformer circuit 124. Similar to the ballast circuit shown in FIG. 2, the current in the current transformer circuit can be relatively large, and the current can be greater or smaller than the current in the lamp circuit. The power factor correction in the ballast circuit can be well optimized using the turns ratio in the current transformer. The transformer circuit isolates the load from low and high frequency signals that otherwise may produce through lamp leakage current. Additionally, input line current waveforms can be made to have the same shape as the input line voltage.

In the ballast circuit shown in FIG. 3 having a current transformer, the feedback circuit can be easily configured to produce the desired result. For example, for a given number and size of lamps to be driven by the ballast, the turns ratio in the transformer can be easily calculated based on the desired input power, lamp current and anticipated peak voltage. Additionally, selection of a capacitor for the feedback circuit can also be made easily.

In the examples of the ballast circuit shown in FIGS. 1-3, the input circuits can be conventional input circuits found in conventional ballasts. The high frequency inverter circuits can take a number of configurations, but in the examples described herein, the inverter circuits will include parallel resonant inverter circuits. They also include high frequency rectifier bridges for power factor correction. The outputs of the high frequency inverter circuits are applied to isolation transformers for producing current in the output or load circuits. Additionally, the feedback circuits can take a number of configurations, several of which are described more fully below. In each of the feedback circuits, the circuits can be configured to feedback a signal to the high frequency inverters as a function only of the current through the load. The feedback circuits preferably are coupled in series with the load. The feedback circuits preferably are coupled in series with the load.

Figure 5:
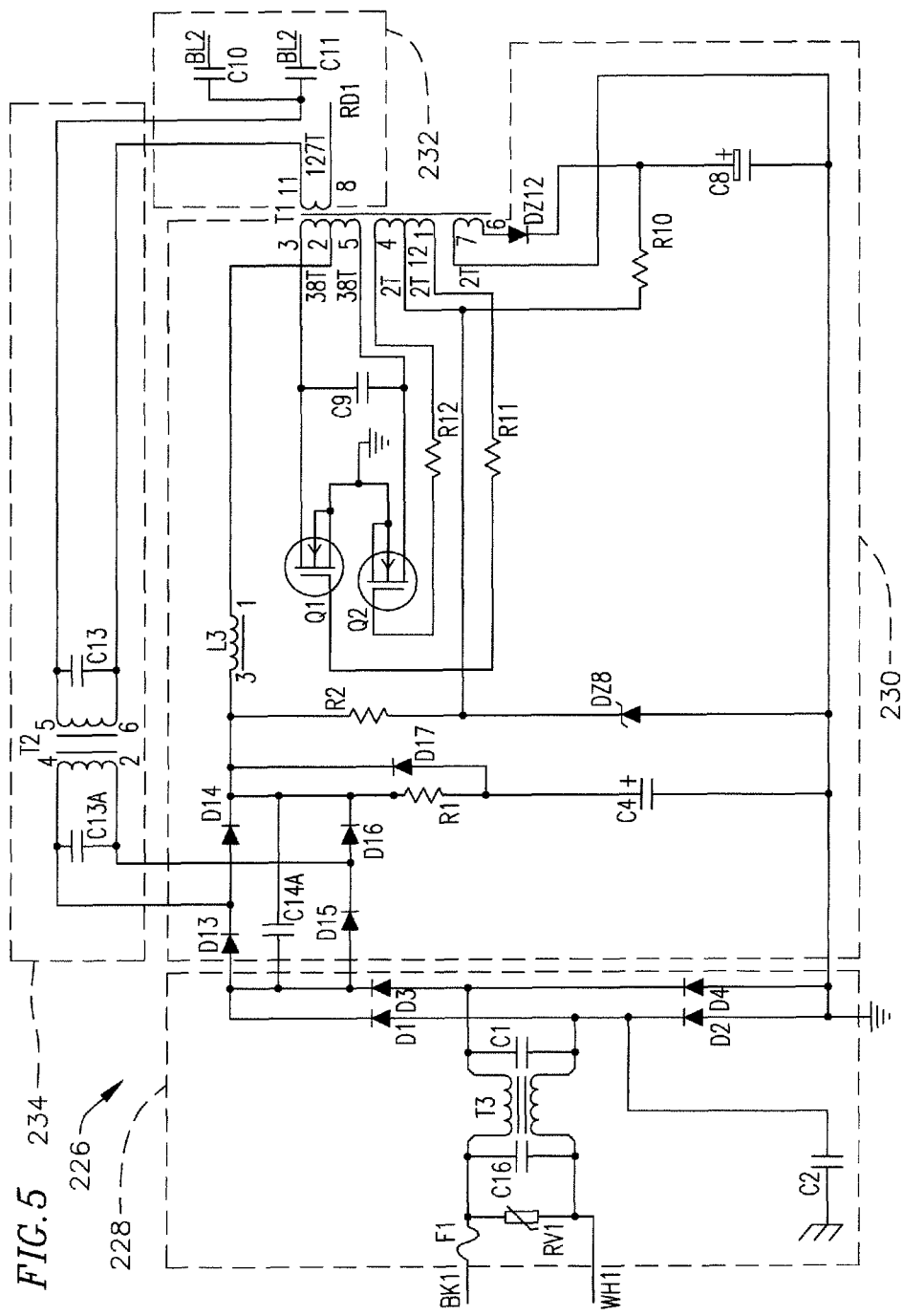
FIG. 5 is a detailed circuit diagram of a power driving circuit of the type represented in FIGS. 1 and 3.

In one example of methods and apparatus described herein, for example of the type described with respect to FIGS. 1 and 2, a ballast circuit 126 for driving a load may include an input 128 (FIGS. 4 and 5). (The load, such as fluorescent lamps, do not form part of the ballast circuit, but is driven by the ballast circuit.) The input may be an alternating current input 130 from a utility or other power generation source. In the present examples described herein, it will be assumed that the AC input 130 receives alternating current input from normal power mains, supplying 120 volts, 240 volts or 277 volts at 50 or 60 Hz. However, if the AC input levels are significantly different from those, circuit component values can be adjusted in the design so that the ballast can easily accommodate voltages other than these. However, the description herein assumes that the AC input conforms to one of the commonly available inputs. Therefore, the present examples are considered in the context of any of the foregoing examples, while it should be understood that other examples are possible.

The ballast circuit 126 also includes a high frequency inverter circuit 130 having suitable output conductors at an output 132 to be coupled to the conductors of a load, such as the terminals in a conventional lamp (not shown). In other lighting system configurations, the ballast circuit can be hard-wired to the lighting unit or units, or coupled to the lighting system in known configurations. The ballast circuit 126 also includes a transformer feedback circuit in the form of a resonant inductor circuit 134, described more fully below.

The input circuit 128 includes input conductors for receiving AC voltage input on a hot and neutral with a fuse for protection against a short circuit or failure inside the ballast. A metal oxide varistor voltage-limiting protection device spans the hot and neutral in parallel with a capacitor C16. The hot and neutral are coupled to respective sides of a transformer T3 in parallel with a capacitor C1 providing input to a conventional full wave bridge rectifier circuit composed of diodes D1, D2, D3 and D4. A full wave rectifier bridge circuit produces a rectified current signal on the rectifier output rail 136 and on the common bus 138.

The high side of the rectified current signal on the rail 136 is coupled to the anodes of a pair of diodes in a diode bridge or high frequency rectifier circuit 140 (FIG. 5). The high frequency rectifier circuit 140 is composed of diodes D13, D14, D15 and D16. The high frequency rectifier (also considered a "floating power supply") is a bridge comprising four diodes D13, D14, D15, D16, connected as shown. The diodes D13, D14, D15, D16 each have a first terminal (e.g., anode) and a second terminal (e.g., cathode). In the polarity configuration of this example, the anodes of diodes D13 and D15 are connected to the positive power supply rail (+). The cathodes of diodes D13 and D15 are connected to the anodes of D14 and D16, respectively, forming two nodes that constitute the "input" of the high speed rectifier bridge. The rectifier circuit also includes a capacitor C14 in parallel with the diode pairs D13/D14 and D15/D16, connected across the bridge, from the positive power supply rail (+) (anodes of D13, D15) to the output to the inductor L3 (cathodes of D14/D16). The output of the rectifier circuit 140 is applied to a capacitor C4, the other side of which is coupled to the common bus 138, and to a middle tap of an output transformer T1 in the output circuit 132, through a choke inductor L3, as described more fully below. Resistor R1, which is optional, limits the inrush current into the bulk capacitor C4. Diode D17 allows current to come out of capacitor C4 without going through resistor RI, thereby improving efficiency. Capacitor C15 bypasses high frequencies around the resistor R1.

The output transformer T1 has a split input winding and two separate output windings. The input winding has a top, a middle and a bottom terminal as seen in FIGS. 4 and 5. The first output winding (shown on the top in the drawing) has a top terminal and a bottom terminal, and the bottom output winding has a top terminal and a bottom terminal. The top and bottom terminals of the input winding of T1 are connected to a push-pull parallel resonant inverter circuit having switching devices (e.g., field effect transistors) Q1 and Q2, respectively, to the common rail (−). The middle terminal of the input winding is connected through the inductor L3 and the high frequency rectifier to the positive power supply rail (+), as noted above. Capacitor C9 forms with the switching transistors and transformer T1 the parallel resonant tank circuit for driving the load.

The gates of the switching transistors are coupled together through an additional winding on the transformer T1 for switching the transistors on and off. A center tap on the additional winding is coupled to the common rail through a resistor R10 and capacitor C8. A diode D12 is coupled to the junction of R10 and C8, and through a secondary winding on the transformer T1 to the common rail.

The drains of the FET switching transistors are coupled to the primary of the transformer T1 and to opposite sides of the capacitor C9. The drain circuit of the transistors is also applied to a transformer T2 of a protection circuit 142, which shuts down the ballast if the current through the transistors increases too much.

The high voltage DC power from C4 also provides a voltage bias through resistor R2 to the gates of the switching transistors, first through the center tap on the additional winding and then through the respective resistors R11 and R12 on the transistor gates. The bias can be removed by the protection circuit 142 through the SCR Q4, as described more fully below.

The output circuit 132 includes connectors or hardware connections to a load such as one or more fluorescent lamps. In the case of fluorescent lamps, the output circuit 132 has a first side coupled to respective ends of the lamps through respective capacitors C10 and C11, and a second side coupled to the opposite ends of lamps through capacitor C12. The first side of the secondary of the transformer T1 is separated from the second side of the secondary of the transformer. The first side of the secondary has an upper line (as viewed in FIG. 4) energizing the lamps and a lower line coupled to one side of the feedback circuit 134. The second side of the secondary has an upper line (as viewed in FIG. 4) coupled to a second side of the feedback circuit 134 and a lower line returning from the lamps. As shown in FIG. 4, the primary input to the transformer T1 is evenly split at 54 turns each. The secondary is un-evenly split at 94 turns for the upper and 76 turns for lower. The lower is smaller because the capacitor C12 associated with it is larger.

In the example shown in FIG. 4, the feedback circuit 134 has a first side applied to one input of the high frequency rectifier 140, between the cathode of diode D15 and the anode of diode D16. The second side of the feedback circuit 134 is applied to a second input of the high frequency rectifier 140, between the cathode of the diode D13 and the anode of the diode D14, through an inductor L4. One or more parallel capacitors CA and CB can be coupled across the inductor L4. CB modifies the impedance of L4 to account for different frequencies that could be encountered in the output circuit during operation. The capacitors CA and CB resonate with inductor L4 at a different frequency to capacitor C13.

The inductor L4 when combined with C13 acts as a transformer that transforms the lamp current into a current to be applied to the high speed rectifier circuit at a level determined by size of the inductor. Additionally, the inductor in the feedback circuit can be used to apply a signal to the high speed rectifier circuit that is a function only of the current through the lamp. The use of the one or more capacitors in the circuit provides a tank circuit in which the current in the circuit can resonate during operation, and the circuit can be configured so that the resonating current can be higher or lower than the current in the lamp circuit. As a result, the feedback circuit can be used to not only lower the current applied to the high speed rectifier circuit but also raise the current applied to the high speed rectifier circuit. Moreover, the feedback in the ballast circuit allows the ballast to be self-limiting, so that if one of several lamps driven by the ballast is removed, the feedback will be reduced and the current in the lamp circuit will be reduced.

In operation in the ballast circuit of FIG. 4, when voltage is applied to the input, C8 becomes charged through R2 and biases the gates of FETs Q1 and Q2 positive until one of them starts to conduct. FETs Q1 and Q2 with transformer T1 and resonant capacitor C9 comprise a conventional current fed push pull parallel resonant inverter which oscillates in a manner well known in the field of electronic ballast design. Ballast capacitors C10 and C11 are used to provide a nearly constant current drive to the lamps. The resulting lamp current produces pulses of current from the power line through the high frequency diode bridge 140 through R1 into the capacitor C4. Correctly adjusting the transformer ratio of the transformer sets the voltage at C4 to be approximately equal to the peak of the line voltage. Therefore, at the peak of the line voltage, no current rushes into C4. Correctly sizing a capacitor C13 so that it bypasses the entire lamp current at the peak of the line will then produce a sinusoidal input. As current flows through the lamp or lamps, the same current is fed back through the feedback circuit 134 creating oscillation in the tank defined by the transforming inductor L4 and the capacitor C13. When the values of the inductance L4 and the capacitor C13 are tuned to resonate at the selected frequency, the lamp current is modified in amplitude so that when rectified by bridge 140, the correct sized line current is pulled in from the power line.

With the output windings split and the current fed back to the high frequency diode bridge, the substantially constant current through the lamp is fed back and applied to the rectifier bridge. The waveform at the input has the lamp current amplitude superimposed it, and the incoming current waveform is no longer a large pulse on each cycle. Additionally, the voltage applied to the high frequency rectifier bridge by the lamp current pulls current from the line into the bridge, and the peak amplitude of the current that is pulled into the bridge is related to the lamp current by the action of the resonant transformer.

When the inductor L4 and the capacitor C13 are selected so as to be tuned to the frequency of the current in the lamp circuit, the resulting current in the resonant tank circuit can be whatever size is needed to achieve the power factor correction. As a result, the right amount of current to achieve the desired degree of power factor correction can be produced. Another benefit is that the incoming current from line input need no longer create peaks or spikes above the normal waveform. In addition to working with L4 as a transformer element, C13 has the property that at line zero crossing the high frequency voltage across it is greatest so that it bypasses all the lamp current, allowing the line current waveform to go to zero at the line voltage zero crossing. The capacitor CA modifies the impedance of the inductor L4 when the inverter runs at a different frequency with one lamp instead of two, allowing better power factor correction in the one lamp configuration.

The power level at which the ballast works is largely determined by the inductor L4, the value of which is typically determined empirically depending on the intended lamp load. The maximum peak-to-peak voltage associated with the high frequency current at the high frequency rectifier bridge is equal to the voltage on the electrolytic capacitor C4 and the lamp current which is fed back is adjusted in amplitude to be comparable to the desired input line current. Under such conditions, the PFC can produce a THD of only one or two percent, for a particular size of lamp. If the feedback circuit instead feeds back a lesser amount of current, the THD might be different, for example 20% THD, and the ballast can achieve this for two or more different lamp sizes. The value of the inductor L4 and the capacitor C13 are selected to improve the power factor correction (PFC) for the selected lamp configuration, such as for 1×32-watt T8 lamp, 1×25-watt T8 lamp, 2×25-watt T8 lamps, 2×32-watt T8 lamps, etc.

The full high speed rectifier bridge is driven by the entire lamp current, modified to the correct level by the resonant action of L4 and C13. Additionally, the split output winding of the output transformer T1 means that neither of the two output windings has enough voltage in and of itself to ignite the lamps. Consequently, any through lamp leakage (TLL) has a reduced impact, if any. Also, if one of two lamps is removed, the current being fed back is halved and the power factor correction is adjusted correspondingly. In the present configuration, the operating frequency of the self oscillating circuit is higher at partial load with one of two lamps than it is at full load with two lamps. Therefore, capacitor CA is placed across inductor L4 and it causes L4 to present a different impedance at the modified partial loading frequency, which allows improved power factor correction in this condition. When no lamps are present, there should be no feedback current.

To reduce any effect of short circuits to ground, the protection circuit 142 (FIG. 4) can be used to sense large current through the switching transistors and shutdown the ballast if the current is too high. Specifically, the current through the transistors is applied to the transistor T2. With enough current, diode D11 conducts and the voltage divider of the resistors R4 and R6 determines the voltage at which the Zener diode D7 becomes forward biased. When that voltage is reached, the shut off circuit is tripped by turning on the SCR Q4 and drawing all the current in the transistor gate circuit through the transistor Q3. Drawing down the current removes the bias from the gates of the switching transistors Q1 and Q2, turning them off.

In another example of methods and apparatus for driving a load (FIG. 5), a ballast circuit 226 for driving a load may include an input 228 similar to that described above with respect to the input 128. A high frequency inverter circuit 230 is substantially the same as the circuit 130 described above except that a protection circuit is not included in the inverter circuit 230. An output circuit 232 is driven by the inverter circuit 230, and a feedback circuit 234 is coupled in the output circuit 232. The feedback circuit 234 is coupled to the input of the high frequency rectifier circuit 240.

As shown in the example of FIG. 5, the output circuit 232 includes a single secondary having 127 turns for a 2-lamp output circuit. One end of the secondary is coupled to a primary of a transformer T2, the other end of which is coupled to capacitors C10 and C11 and their respective lamps. The other ends of the lamps are connected to the other end of the 127 turns secondary of the transformer T1. One or more capacitors C13 and C13A are coupled across the two lines of the feedback circuit, in parallel with the primary of transformer T2. The secondary of the transformer T2 is coupled across the high frequency rectifier circuit 240, to the inputs of the high frequency rectifier circuit 240. The circuit may use C13 across the primary of T2, or the circuit instead may use a capacitor C13A across the secondary of T2, or the circuit may use both. One or more or all of the capacitors C13 can also be placed across the secondary of the transformer T2.

As can be seen in this embodiment relative to that of FIG. 4, the resonant LC transformer comprised of C13 and L4 is replaced by a current transformer T2. In order to get the desired amount of current to the high frequency bridge to achieve the desired power factor correction, the turns ratio of T2 is adjusted accordingly. Thus the current fed back can be either larger or smaller than the lamp current, allowing the circuit to be used for a wide range of lamps and supply voltages. In addition, since the transformer ratio is not dependent on the frequency, the manufacturing is simplified since the exact value of L4 is no longer as significant and the frequency is not required to be controlled as accurately. Capacitor C13 in FIG. 5 is chosen as follows: at line zero crossing, the voltage across the high frequency bridge is maximum and of a peak value equal to the voltage on C14. Since no power factor correction current is required at this point in the cycle, C13 is sized such that with this peak voltage present on the secondary of T2 and the normal running frequency, the entire lamp current then passes through C13. The equation for finding C13 is provided below.

In operation, the inverter circuit drives the output circuit through the transformer T1, and the lamp current passes through the primary of the feedback transformer T2. A feedback current is then applied to the input of the high frequency rectifier circuit 240 as a function of the primary and secondary windings in the feedback transformer T2. The precise current applied to the high frequency rectifier circuit 240 can be selected as a function of the transformer T2 turns ratio. The feedback current can be either stepped up or stepped down. Increasing the primary turns of T2 increases the current delivered to the input, and decreasing the primary turns decreases the current delivered to the input.

Use of the transformer T2 in the feedback circuit reduces or eliminates the possibility of through lamp leakage through the feedback circuit. Without any galvanic path from the input to the output, the protection circuit used in the example of FIG. 4 can be omitted.

The operation of the circuit can be affected by the value of C13 and C13A. With appropriately chosen values and the right turns ratio for T2, the total harmonic distortion can be as low as one percent. Additionally, having C13A on the secondary side of the transformer T2 as well as C13 on the primary side improves a parameter known as lamp current crest factor (LCCF).

The turns ratio for the feedback transformer T2 can be determined from the following equation:

$$N_1/N_2 = P/(V_{in} * I_l),\qquad\text{(EQ. 1—Turns Ratio)}$$

Here N1 is the number of primary windings (connected to the output circuit) and N2 is the number of secondary windings (connected to the input circuit)

As can be seen, the turns ratio $N_1/N_2$ is a function of the expected input power, P, and inverse of the lamp current, $I_l$, and inverse of the rms input voltage, $V_{in}$. Therefore, for a given lamp configuration, the configuration of the transformer can be determined exactly.

The value of the capacitor C13 can also be determined for a given lamp configuration. In the absence of C13A, the capacitor C13 can be determined from the following equation:

$$C13 = (I_l)^2 / (2\pi f P)\qquad\text{(EQ. 2—Capacitor)}$$

In the capacitor equation, $I_l$ is the lamp current, f is the ballast operating frequency, and P is the desired power input to the ballast. Once the turns ratio of the feedback transformer T2 and the capacitor C13 are determined according to these formulae, it will be found that the input current is a true sine wave. This circuit as described with a turns ratio and capacitance calculated according to the Equations 1 & 2 is using the impedance of the lamp to achieve power factor correction. Because the equations are related to the input voltage and the load, the circuit only gives the optimum power factor correction for one predetermined lamp size. In industrial applications, it may be desirable to design the ballast to operate a range of lamps with higher THD rather than just to drive one specific lamp size with negligible THD. In such a case, lower THD is sacrificed somewhat for more flexibility in accommodating a wider range of loads for a given circuit configuration. When this is done the component values will be chosen to be different to those specified above. For example, the feedback current can be fed back at a lower level than the equations would indicate by decreasing the turns on the primary of the transformer T2, or by increasing the capacitance of C13, or an appropriate combination of both. Additionally, R1 can be increased above what would otherwise be used in the circuit. One or more of these adjustments could be made, for example, where positive current feedback is to be reduced. Alternatively, if current feedback is to be increased, the secondary turns of the transformer T2 can be increased or the capacitance of C13 decreased, or an appropriate combination of both. In addition, the theory which is used to derive the relationships above assumes that the frequency is constant. In reality the frequency varies slightly throughout the line cycle and this causes the optimum component values to differ slightly from the formulae given above. Therefore, C13/C13A could be selected empirically by adjusting the capacitance up or down from the calculated value until a value is reached that produces the desired feedback.

With the ballast circuit of FIG. 5, the circuit automatically adjusts the power factor correction when lamps are removed. If all lamps are removed, no current flows in the feedback circuit. When one of two lamps is removed, half of the feedback is removed as is needed to drive half the lamps. The frequency change associated with lamp removal prevents the power factor correction from being as perfect with one lamp as with two.

Any number of combinations of inductors, capacitors and impedances of any kind can be combined to make other networks for the feedback path. The principles can work with any parallel resonant ballast whether the switches are MOSFETs or bipolar. The parallel resonant inverter may be push-pull or half bridge driven, or any of the variations of these topologies or others that are well known in the literature. The inverter may be of any of the types well known in the literature, for example current fed, voltage fed or even class E (single transistor). The high frequency rectifier may be configured in any of the numerous ways shown in the literature, for example as a half bridge, or two half bridges, or combined with the input rectifier being used also as a part of the high speed rectifier.

Some possible values for the components shown in FIG. 5 for a 120 volt ballast for 2 32 Watt T-8 lamps are shown in Table 1, below.

TABLE 1

| Component | Description | Specification | | | |
|---|---|---|---|---|---|
| C1, C14, C16 | Film Cap | 0.33 uF 250 V~400 V | | | |
| C2 | Ceramic Cap | 4700 PF 3 KV | | | |
| C4 | E-Cap | 100 uF 200 V~430 V | | | |
| C8 | E-Cap | 22 uF 25 V~50 V | | | |
| C9 | Film Cap | 3900 pF 1.6 KV~3 KV | | | |
| C10, C11 | Film Cap | 1000 pF 1.6 KV~3 KV | | | |
| C13 | Film Cap | 1000 pF 630 V~1 KV | | | |
| C13A | Film Cap | 8200 pF 630 V~1 KV | | | |
| C15 | Capacitor | N/A | | | |
| R1 | Resistor | 10 3 W | | | |
| R1A | Resistor | N/A | | | |
| R2 | Resistor | 56 K 1 W | | | |
| R10 | Resistor | 330 ½ W | | | |
| R11, R12 | Resistor | 22 ¼ W | | | |
| RV1 | Varistor | 150 V~300 V | | | |
| D1, D2, D3, D4, D13, D14, D15, DD16, D17 | Diode | 1N4937 | | | |
| D12 | Diode | 1N4148 | | | |
| DZ8 | Diode | BZX55 | | | |
| Q1, Q2 | Transistor | STP5NK60Z | | | |
| L3 | Inductor | 3.32 mH, 255 turns, 11 layers, 25/5 turns/Layer | | | |
| T1 | Transformer | 93 mH | | | |
| | | Windings | Turns | Layers | Turns/Layer |
| | | Np1 | 51 | 2 | 27/24 |
| | | Np2 | 51 | 2 | 27/24 |
| | | Nd1 | 3 | 1 | 3 |
| | | Nd2 | 3 | 1 | 3 |
| | | Ns1 | 99 | 4 | 27/18 |
| | | Ns2 | 71 | 3 | 27/17 |
| | | Nd3 | 3 | 1 | 3 |
| T2 | Transformer | 11 mH | | | |
| T3 | Inductor | At least 10 mH | | | |
| | | Windings | Turns | Layers | Turns/Layer |
| | | N1 | 75 | 10 | 8/3 |
| | | N2 | 75 | 10 | 8/3 |
| C1, C14, C16 | Film Cap | 0.33 uF 250 V~400 V | | | |
| F1 | Fuse Tube | 5 A/125 V | | | |

In another example of a method and apparatus for driving a load (FIG. 6), a ballast circuit 226A for driving a load is substantially identical to circuit 226 of FIG. 5 except for a feedback circuit 234A. In the ballast circuit 226A, the structure and function of the ballast circuit 226A is substantially the same as that described above with respect to FIG. 5, with the added feature of a self adjusting feedback circuit. The feedback circuit can also be a variable feedback circuit or an adjustable feedback circuit. In the example shown in FIG. 6, the feedback circuit 234A, in addition to the transformer T2 and either or both capacitors C13 and C13A, includes a feedback changing device. The feedback changing device can change the feedback in the feedback circuit 234A gradually over time or gradually over changes in lamp current. The feedback changing device can change the feedback instantaneously or after a delay.

In one example of a feedback changing device, a changing device takes the form of a bypass device 236. The bypass device 236 in this example may be any device that limits voltage or current in the feedback circuit above a certain level. The bypass device can take a number of forms. In the example shown in FIG. 6, the bypass device SCR1 consists of a SIDAC. However a TRIAC combined with a zener diode could provide the same function, and an assemblage of SCR (s) and a zener diode could also be used. The SCR1 and capacitor C17 are coupled in parallel with the secondary of the transformer T2. The transformer T2 is configured, for example by adding turns, so as to develop the desired voltage suitable for triggering SCR1 at the selected time/threshold. When the SCR1 conducts, current in the secondary is shunted through the capacitor C17 to the opposite side of the secondary during that portion of any cycle in which the voltage on the secondary of the transformer T2 in the feedback circuit exceeds a selected amount. While the feedback changing device can include a single bypass device, it should be understood that two or more bypass devices can be used. For example, multiple bypass devices could be used in which each bypass device would be triggered at a different threshold than the other(s).

The bypass device may take a number of other forms. For example, the bypass device can include a MOSFET, TRIAC, SIDAC or other component. Other components can also be used to interrupt or bypass the current in the feedback circuit. The bypass device may respond to either voltage or current in the secondary to drain off current during each cycle as necessary.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A ballast circuit comprising:
 an input circuit characterized by having a power factor;
 an output circuit having circuit portions for delivering current to a load;
 a parallel resonant inverter circuit coupled between the input circuit and the output circuit;
 a power feedback circuit coupled between the input circuit and the inverter circuit and configured to be able to adjust the power factor of the ballast circuit; and
 a high-frequency-current blocking component in the power feedback circuit;

wherein the high-frequency-current blocking component includes a transformer stage;

wherein the high-frequency-current blocking component includes a high frequency bridge and a capacitor across the power feedback circuit, wherein the capacitor is sized such that at line voltage zero crossing, a current approximately equal to the entire lamp current is bypassed through the capacitor.

2. The ballast circuit of claim 1 wherein the transformer stage includes an inductor and a capacitor.

3. The ballast circuit of claim 1 wherein the transformer stage includes a current transformer.

4. The ballast circuit of claim 1 wherein the high-frequency-current blocking component operates at a substantially constant current.

5. The ballast circuit of claim 1 wherein the high-frequency-current blocking component includes a diode bridge.

6. The ballast circuit of claim 5 wherein the diode bridge is configured to form a high frequency rectifying bridge.

7. A ballast circuit comprising:
an input circuit characterized by having a power factor;
an output circuit having circuit portions for delivering current to a load;
a parallel resonant inverter circuit coupled between the input circuit and the output circuit;
a power feedback circuit coupled between the input circuit and the inverter circuit and configured to be able to adjust the power factor of the ballast circuit;
a high-frequency-current blocking component in the power feedback circuit; and
an output transformer in the output circuit and an inductor in series with a secondary of the output transformer.

8. The ballast circuit of claim 7 wherein the inductor, the secondary of the output transformer and a lamp are in series.

\* \* \* \* \*